US012685975B2

(12) United States Patent
Tsunemoto et al.

(10) Patent No.: US 12,685,975 B2
(45) Date of Patent: Jul. 21, 2026

(54) SLIT CHAMBER AND ATOMIZING APPARATUS

(71) Applicant: SUGINO MACHINE LIMITED, Namerikawa City (JP)

(72) Inventors: Masashi Tsunemoto, Namerikawa City (JP); Yuki Morioka, Namerikawa City (JP)

(73) Assignee: SUGINO MACHINE LIMITED, Namerikawa City (JP)

( * ) Notice: Subject to any disclaimer, the term of this patent is extended or adjusted under 35 U.S.C. 154(b) by 141 days.

(21) Appl. No.: 18/755,614

(22) Filed: Jun. 26, 2024

(65) Prior Publication Data

US 2025/0012303 A1 Jan. 9, 2025

(30) Foreign Application Priority Data

Jul. 5, 2023 (JP) ................................. 2023-110703

(51) Int. Cl.
*B01F 25/23* (2022.01)
*B01F 23/41* (2022.01)
(Continued)

(52) U.S. Cl.
CPC .............. *F15D 1/025* (2013.01); *B01F 23/41* (2022.01); *B01F 25/23* (2022.01); *B01F 25/4412* (2022.01)

(58) Field of Classification Search
CPC .. B01F 25/23; B01F 25/4412; B01F 25/4413; B01F 23/41; B01F 25/44121; B01F 25/4421; B01F 23/21321; B05B 1/044
See application file for complete search history.

(56) References Cited

U.S. PATENT DOCUMENTS

| | | | |
|---|---|---|---|
| 4,189,243 | A | 2/1980 | Black |
| 5,723,518 | A | 3/1998 | Kahl et al. |

(Continued)

FOREIGN PATENT DOCUMENTS

| | | | |
|---|---|---|---|
| JP | H05-012976 | B2 | 2/1993 |
| JP | 2788010 | B2 | 8/1998 |

(Continued)

OTHER PUBLICATIONS

Extended European Search Report mailed on Dec. 3, 2024 in a corresponding European Patent Application No. 24182663.5 (9 pages).

*Primary Examiner* — Marina A Tietjen
(74) *Attorney, Agent, or Firm* — United IP Counselors, LLC

(57) ABSTRACT

Provided is a slit chamber capable of processing a large amount of a raw material even when the input amount of the raw material increases, and capable of suppressing the leakage of the raw material in a compact manner. The slit chamber includes a water guide nozzle to which a raw material is introduced; an upstream nozzle disposed downstream of the water guide nozzle and including an upstream nozzle water guide for the raw material to pass through; an intermediate nozzle disposed downstream of the upstream nozzle and including an intermediate nozzle atomizing channel to atomize the raw material; and a downstream nozzle disposed downstream of the intermediate nozzle and including a downstream nozzle atomizing channel to atomize the raw material that has flown the intermediate nozzle.

20 Claims, 12 Drawing Sheets

(51) Int. Cl.
*B01F 25/441* (2022.01)
*F15D 1/02* (2006.01)

(56) References Cited

U.S. PATENT DOCUMENTS

| | | | | |
|---|---|---|---|---|
| 6,631,851 | B1 * | 10/2003 | Adkins | B05B 3/1028 239/223 |
| 6,877,726 | B1 | 4/2005 | Rindt et al. | |
| 2013/0242692 | A1 | 9/2013 | Soukup | |
| 2022/0234011 | A1 * | 7/2022 | Maeda | B01F 23/21321 |
| 2022/0234015 | A1 * | 7/2022 | Enomura | B01F 23/41 |

FOREIGN PATENT DOCUMENTS

| | | | |
|---|---|---|---|
| JP | 2022-063686 | A | 4/2022 |
| WO | 2004/020080 | A1 | 3/2004 |

* cited by examiner

SLIT CHAMBER AND ATOMIZING APPARATUS

CROSS-REFERENCE TO RELATED APPLICATIONS

This application claims the benefit of priority to Japanese Patent Application No. 2023-110703, filed on Jul. 5, 2023, the entire contents of which are hereby incorporated by reference.

BACKGROUND

1. Technical Field

The present invention relates to a slit chamber and an atomizing apparatus.

2. Description of the Background

Conventionally, a ball mill, a colloid mill, a disperser, a homogenizer, and the like are used as an atomizing apparatus.

In order to adjust the characteristics of the raw material and the performance to be imparted, the atomizing apparatus has a chamber having a nozzle. Conventionally, a structure of a nozzle or a liner called as slit chamber is known.

For example, in the emulsifying apparatus disclosed in Japanese Patent No. 2788010 and JP H05-012976 B, a flow path is closed by two liner members made of a hard plate material. In the first liner member disposed on the inflow side, two first through holes are formed so as to pass therethrough at positions symmetrical with respect to a center of the plate surface. Each liquid mixture ejected from the nozzle can pass through two first through holes. The first liner member has a groove portion that allows the end portion of the through hole to communicate with one of the plate surfaces. The second liner member is disposed on the outflow side in close contact with the first liner member. The second liner member has a second groove portion on a surface closely opposed to the first liner member. The second groove is orthogonal to the first groove. Two second through holes for discharging are formed at both outer ends of the second groove portion. Emulsification is performed while the mixture passes through the first and second liner members.

JP 2022-63686 A discloses a slit chamber. For a plurality of nozzles constituting the slit chamber, holes, grooves, and the like formed in the upstream nozzle and the downstream nozzle are devised so as not to concentrate stress in a specific portion.

BRIEF SUMMARY

In the conventional emulsifying apparatus, when an attempt is made to increase the processing amount per hour, it is necessary to improve the nozzle structure such as increasing the number of slit chambers, increasing the size of various nozzles, increasing the channel or increasing the channel diameter. However, arranging a plurality of chambers in parallel requires more space. In addition, this could cause an excessive increase in size of the nozzle.

Increasing the number of nozzles could increase a gap between the nozzles and could cause leakage of the raw material. Further, even if the amount of processing is increased, the effect of increasing the size is reduced if the processing performance is deteriorated. Thus, not only increasing the number of nozzles but also maintaining or improving the processing performance is required.

An object of the present invention is to provide a slit chamber and an atomizing apparatus capable of processing a large amount of raw material even when the input amount of the raw material increases, and capable of suppressing the leakage of the raw material in a compact manner.

A first aspect of the present disclosure provides a slit chamber, including:

- a water guide nozzle to which a raw material is introduced;
- an upstream nozzle disposed downstream of the water guide nozzle, the upstream nozzle including an upstream nozzle water guide for the raw material to pass through;
- an intermediate nozzle disposed downstream of the upstream nozzle, the intermediate nozzle including an intermediate nozzle atomizing channel to atomize the raw material; and
- a downstream nozzle disposed downstream of the intermediate nozzle, the downstream nozzle including a downstream nozzle atomizing channel to atomize the raw material that has flown the intermediate nozzle.

A second aspect of the present disclosure provides an atomizing apparatus, including:

- a raw material tank configured to store a raw material;
- a liquid supply pump configured to pressurize and supply the raw material in the raw material tank;
- a pressure intensifier configured to pressurize the raw material supplied from the liquid supply pump; and
- the slit chamber.

The present invention provides a slit chamber and an atomizing apparatus capable of processing a large amount of raw material even when the input amount of the raw material increases, and capable of suppressing the leakage of the raw material in a compact manner.

DETAILED DESCRIPTION

Hereinafter, an embodiment will be described in detail with reference to the drawings as appropriate.

The present invention relates to a slit chamber and an atomizing apparatus for atomizing a raw material slurry.

Embodiment

Hereinafter, an atomizing apparatus 100 and a slit chamber 1 used in the atomizing apparatus 100 according to the embodiment will be described with reference to the drawings as appropriate.

Figure 1:
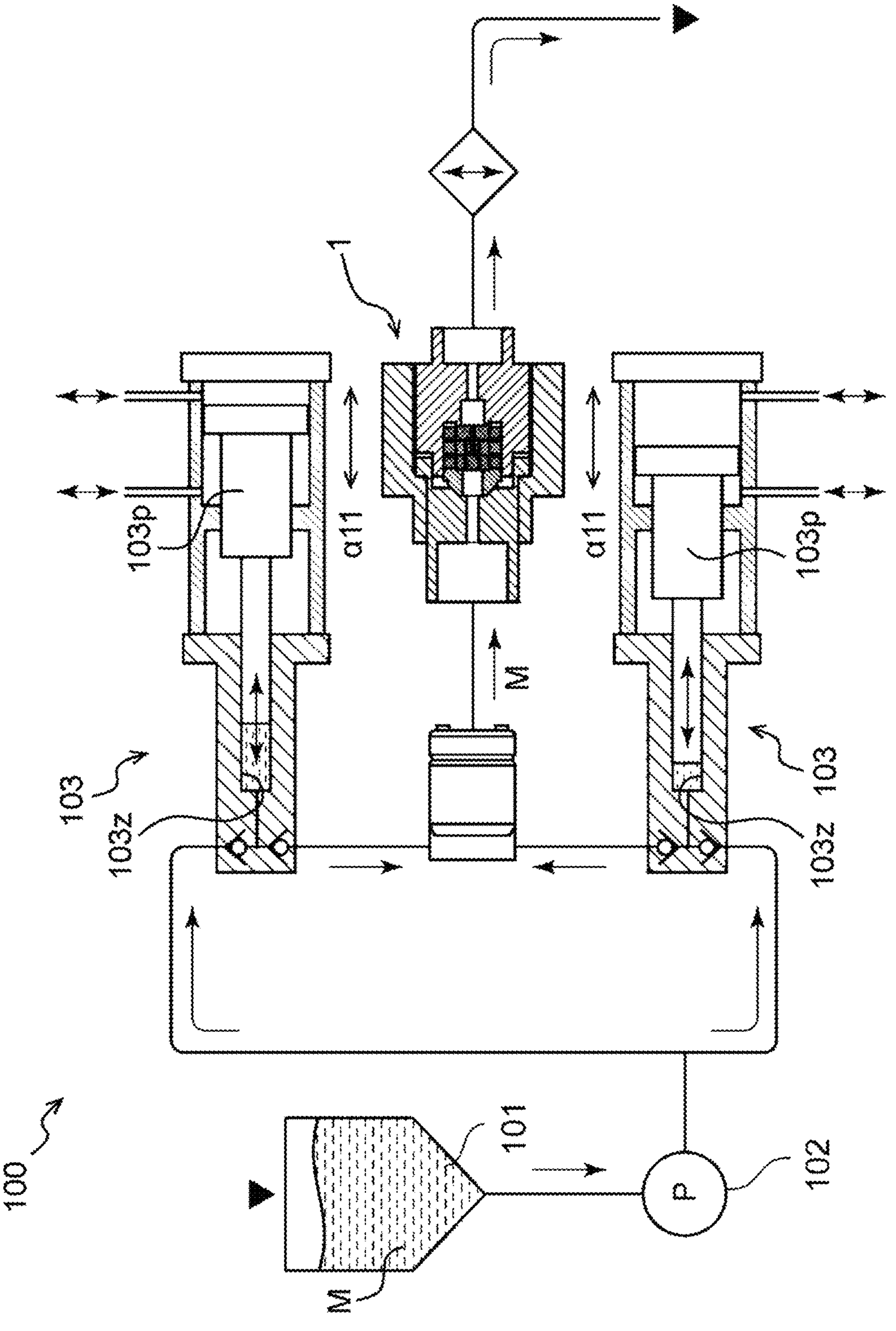
FIG. 1 is a schematic sectional view of a configuration of an atomizing apparatus according to an embodiment.

FIG. 1 shows a schematic sectional view of a configuration of the atomizing apparatus 100 according to the embodiment.

The atomizing apparatus 100 according to the embodiment includes a raw material tank 101, a liquid supply pump 102, a pressure intensifier 103, and a slit chamber 1. The slit chamber 1 atomizes the pressurized slurry raw material M. The slit chamber 1 has a columnar shape such as a substantially cylindrical shape. The outer shape of the slit chamber 1 may be a substantially polygonal prism shape.

The raw material tank 101 stores the slurry raw material M. The liquid supply pump 102 pumps the slurry raw material M in the raw material tank 101 toward the pressure intensifier 103.

The pressure intensifier 103 pressurizes the slurry raw material M fed from the liquid supply pump 102 and sends it to the slit chamber 1.

The slit chamber 1 performs an atomizing processing including an emulsification processing on the pressurized slurry raw material M.

A high-pressure pipe, a high-pressure hose, or the like to which the slurry raw material M is fed is connected to the atomizing apparatus 100.

Next, a processing procedure in the atomizing apparatus 100 according to the present embodiment will be described.

First, the raw material M to be atomized is charged into the raw material tank 101 to be adjusted to a slurry state. Next, the slurry raw material M in the raw material tank 101 is pumped into a pressure-intensifying chamber 103*z* of the pressure intensifier 103 by the liquid supply pump 102. The pumped slurry raw material M is pressurized by the reciprocating motion of a piston 103*p* of the pressure intensifier 103 as indicated by an arrow $\alpha$11 in FIG. 1.

Figure 2:
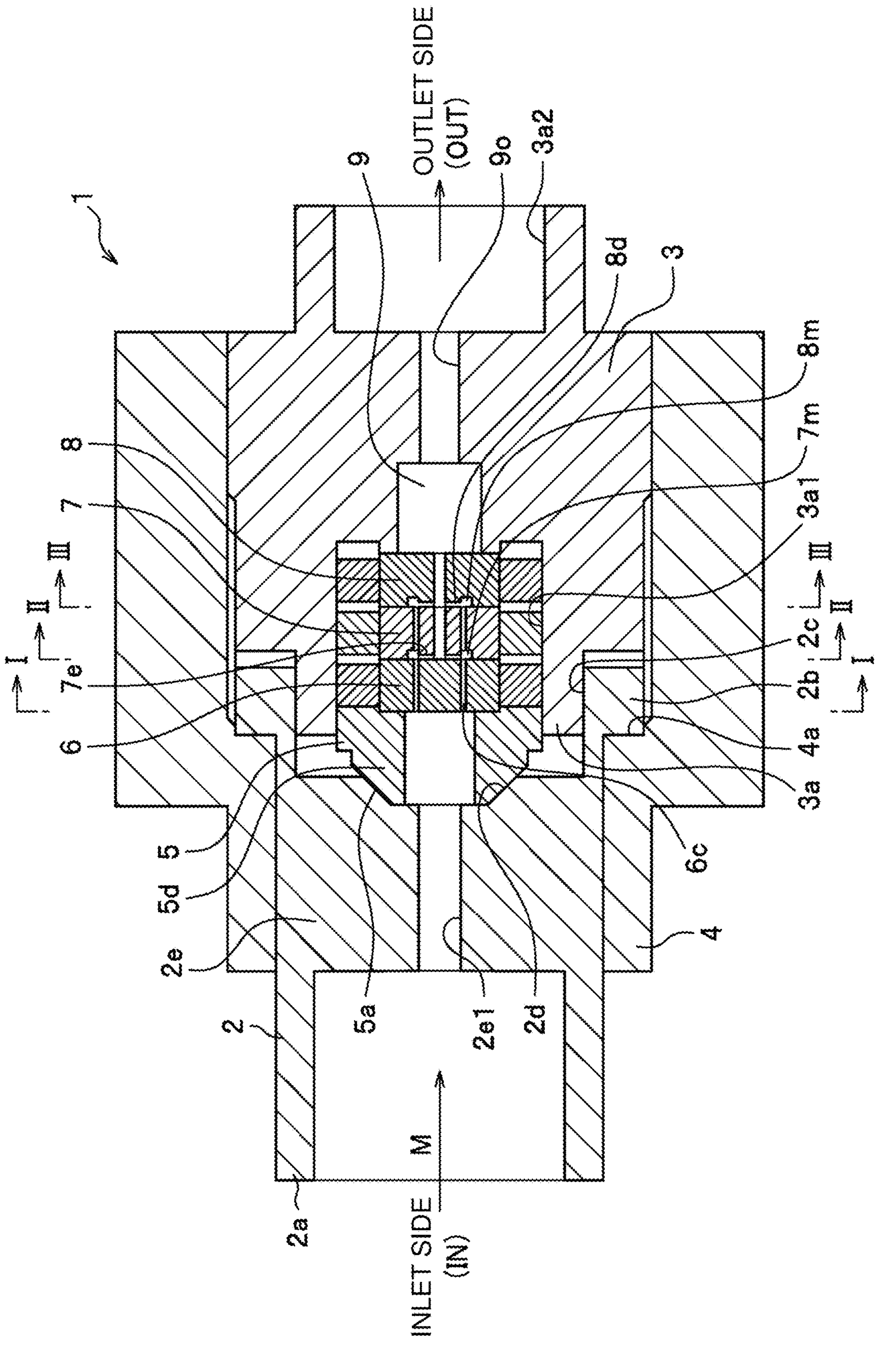
FIG. 2 is a sectional view of a slit chamber according to the embodiment.
Figure 3A:
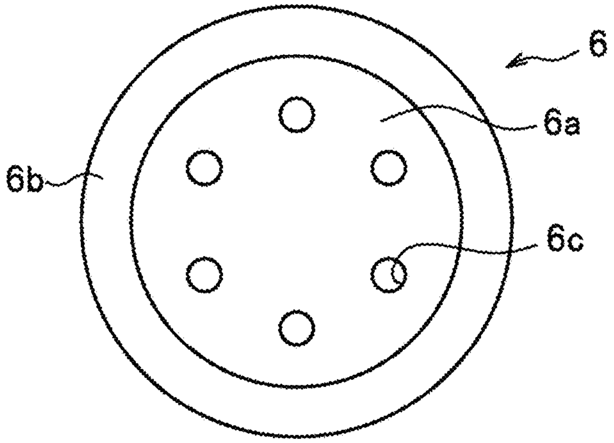
FIG. 3A is a front view of an upstream nozzle, which is I-I cross section of FIG. 2.
Figure 3B:
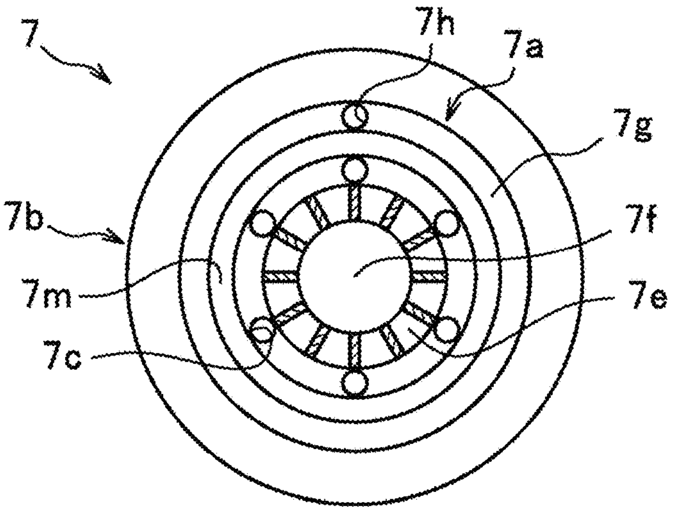
FIG. 3B is a front view of an intermediate nozzle, which is II-II cross section of FIG. 2.
Figure 3C:
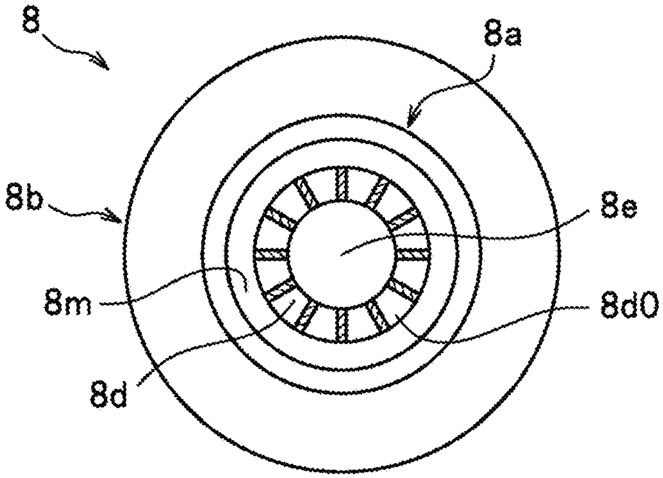
FIG. 3C is a front view of a downstream nozzle, which is III-III cross-section of FIG. 2.

FIG. 2 shows a sectional view of the slit chamber 1 according to the embodiment. FIG. 3A shows a front view of an upstream nozzle 6, which is I-I cross-section of FIG. 2. FIG. 3B shows a front view of an intermediate nozzle 7, which is II-II cross-section of FIG. 2. FIG. 3C shows a front view of a downstream nozzle 8, which is III-III cross-section of FIG. 2.

The slit chamber 1 includes a first end portion 2*a* disposed at a distal end portion to be connected to a high-pressure pipe, a high-pressure hose, or the like. The slurry raw material M pressurized by the pressure intensifier 103 is supplied to the slit chamber 1 via the high-pressure pipe, the high-pressure hose, or the like.

The slurry raw material M supplied to the first end portion 2*a* passes through the channel inside a water guide nozzle 5 to enter an upstream nozzle water guide 6*c* of the upstream nozzle 6. The slurry raw material M then enters the intermediate nozzle 7 while passing through the upstream nozzle water guide 6*c*. The diameter of the raw material M is reduced by an intermediate nozzle atomizing channel 7*e*. This generates shear stress and impact force for the raw material M to be atomized.

The raw material M that cannot be processed by the intermediate nozzle 7 collides with an end face of the downstream nozzle 8 from the intermediate nozzle water guide 7*c*, and changes its trajectory in a right angle to be reduced in diameter by a downstream nozzle atomizing channel 8*d*. This generates shear stress and impact force for the raw material M to be atomized. The impact force includes not only a collision force between the raw materials M but also a collision force in which the raw materials M collide with a surface of the channel (7*e*, 8*d*).

The raw material M atomized by the intermediate nozzle 7 and the downstream nozzle 8 is ejected from a merging port 9 via an intermediate nozzle through-hole 7*f* and a downstream nozzle through-hole 8*e*. Note that the atomizing process may be repeated not only once but also a plurality of times.

In the slit chamber 1 shown in FIG. 2, the slurry raw material M is supplied from an inlet side (IN) toward an outlet side (OUT). The slit chamber 1 has a first chamber inner member 2, a second chamber inner member 3, and a chamber outer member 4.

The first chamber inner member 2 includes a cylindrical first end portion 2*a* forming a first end, a cylindrical peripheral edge 2*b* and a recess 2*c* forming a second end, and a columnar central portion 2*e*. That is, the first chamber inner member 2 has a hole-shaped recess 2*c* and a flange-shaped peripheral edge 2*b* at a rear end portion (downstream end portion). The recess 2*c*, which is cylindrical, is formed downstream of the central portion 2*e*. The flange-shaped peripheral edge 2*b* is formed on an outer peripheral of the recess 2*c*. The central portion 2*e* has, at a center, a through-hole 2*e*1 through which the raw material M flows.

The slurry raw material M pressurized by the pressure intensifier 103 is introduced into the first chamber inner member 2 shown in FIG. 2. The slurry raw material M is thus taken into the through-hole 2*e*1 from the first end portion 2*a*.

It should be noted that the first end portion 2*a* may be any shape to be easily connected to a part of the atomizing apparatus 100. The first end portion 2*a* is, for example, a cylindrical shape or a columnar shape having a polygonal cross section. In addition, a single push type fixing member may be disposed in a part of the first end portion 2*a* so that the high-pressure pipe, the high-pressure hose, or the like can be easily connected.

The second chamber inner member 3 is connected to a rear end portion (downstream end portion) of the first chamber inner member 2. As shown in FIG. 2, the second chamber inner member 3 has a hole 3*a*1 on the first side and a hole 3*a*2 on the second side. The hole 3*a*1 receives a substantially columnar nozzles (5, 6, 7, 8). The nozzles (5, 6, 7, 8) have a function of atomizing the raw material M.

The first chamber inner member 2 and the second chamber inner member 3 are connected by fitting, press-fitting, or the like. The chamber outer member 4 is disposed outside the first chamber inner member 2 and the second chamber inner member 3.

As shown in FIG. 2, the water guide nozzle 5, the upstream nozzle 6, the intermediate nozzle 7, and the downstream nozzle 8 are disposed in the hole 3*a*1 of the second chamber inner member 3. The water guide nozzle 5 has a first frustoconical portion 5*d* of the water guide nozzle 5 to be close contact with the first chamber inner member 2. The upstream nozzle 6, the intermediate nozzle 7, and the downstream nozzle 8 are arranged in this order in a downstream of the water guide nozzle 5.

As shown in FIG. 2, the merging port 9 for ejecting liquid having a medium diameter, a merging port 90 having a small diameter, and a hole portion 3*a*2 having a larger diameter than the merging port 9 are arranged at the rear of the nozzles (5, 6, 7, 8) in the second chamber inner member 3.

The cylindrical chamber outer member 4 has a cylindrical stepped engagement portion 4*a* on the inner side. The flange-shaped peripheral edge 2*b* of the first chamber inner member 2 engages with the engagement portion 4*a*. The engagement between the chamber outer member 4 and the first chamber inner member 2 determines a reference plane for positioning the first chamber inner member 2, the water guide nozzle 5, the upstream nozzle 6, the intermediate nozzle 7, the downstream nozzle 8, and the second chamber inner member 3.

The recess 2*c* of the first chamber inner member 2 has a depth sufficient to accommodate the water guide nozzle 5. The second chamber inner member 3 has a cylindrical second distal end 3*a*. The recess 2*c* may have strength and structural stability in a state in contact with the outer peripheral surface of the second distal end 3*a*.

The peripheral edge 2*b* of the first chamber inner member 2 may stably engage the first chamber inner member 2 and the chamber outer member 4.

The peripheral edge 2*b* of the first chamber inner member 2 and the engagement portion 4*a* of the chamber outer member 4 abut each other, and thus may be formed of a highly rigid or hard material. Further, the peripheral edge 2*b* and the engagement portion 4*a* may be coated with a highly rigid or hard material. The peripheral edge 2*b* and the engagement portion 4*a* have widths and sizes that can be engaged with each other. The first chamber inner member 2 and the chamber outer member 4 may be engaged with each other via a resin component.

The second chamber inner member 3 has a second distal end 3*a*. The second distal end 3*a*, which is cylindrical, is formed in upstream side. The second distal end 3*a* is joined to the recess 2*c*.

The slurry raw material M is thus supplied from the channel formed in the first chamber inner member 2 to the water guide nozzle 5, the upstream nozzle 6, the intermediate nozzle 7, and the downstream nozzle 8.

The first chamber inner member 2 and the second chamber inner member 3 are arranged inside the chamber outer member 4. The chamber outer member 4 fixes the positions of the first chamber inner member 2 and the second chamber inner member 3. By applying a clamping force to the entire slit chamber 1 by the chamber outer member 4, the position of the channel through which the slurry raw material M passes is stabilized.

Figure 4:
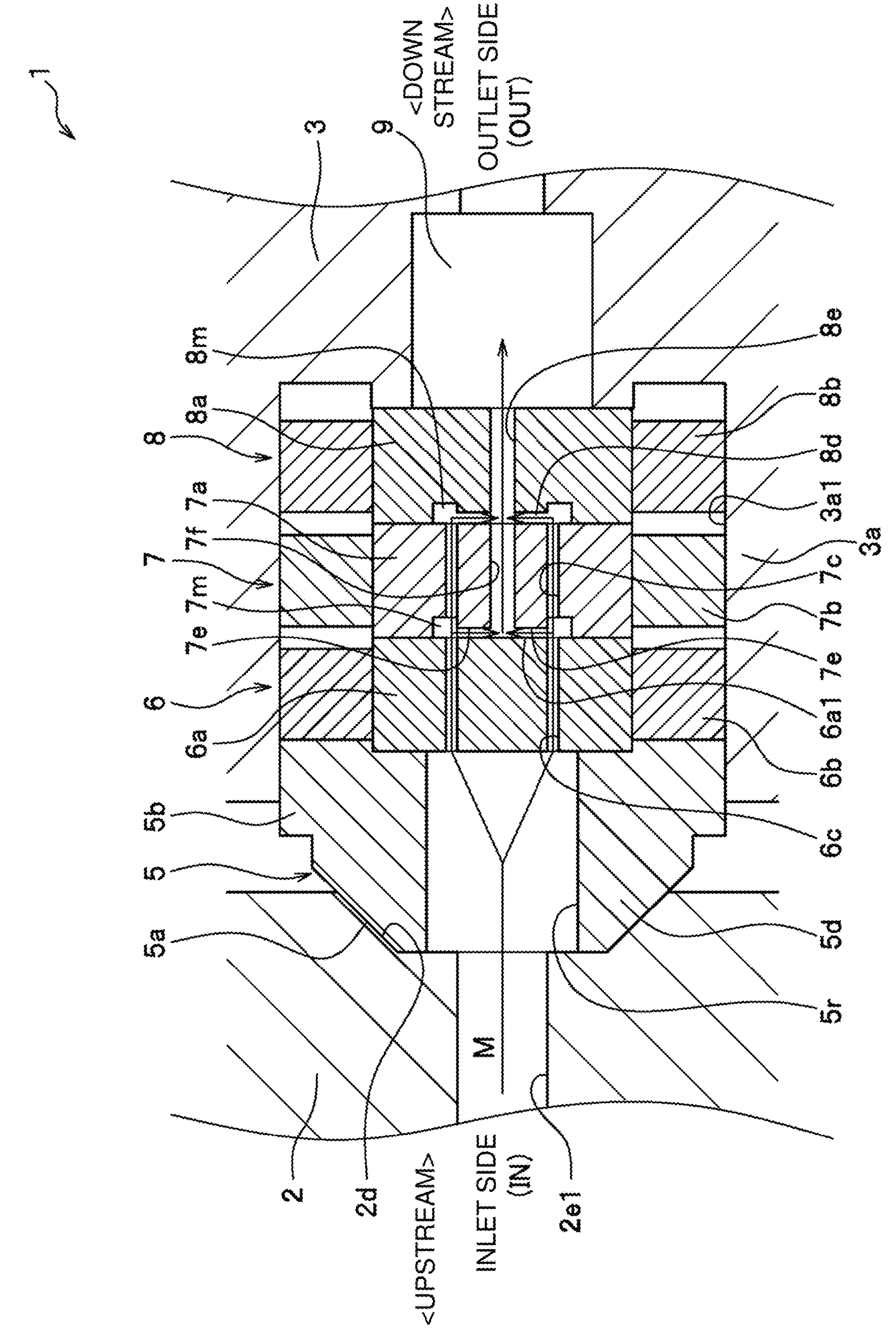
FIG. 4 is an enlarged sectional view of a main portion of the slit chamber according to the embodiment.

FIG. 4 shows an enlarged sectional view of the main part of the slit chamber 1. As shown in FIG. 4, the water guide nozzle 5 adjusts the tightening positions of the first chamber inner member 2 and the second chamber inner member 3 in a state where the positions of the upstream nozzle 6, the intermediate nozzle 7, and the downstream nozzle 8 are stabilized.

The water guide nozzle 5 has a conical-shaped taper projection 5*a* in upstream side. The first chamber inner member 2 has a conical-shaped taper recess 2*d* in downstream side. The taper projection 5*a* and the taper recess 2*d* are disposed so as to be in surface-contact and sealed.

The water guide nozzle 5 includes a water guide nozzle peripheral edge 5*b* on a downstream outer periphery. The water guide nozzle peripheral edge 5*b* has an outer diameter equal to an inner diameter of the hole 3*a*1 of the second distal end 3*a*. This causes the water guide nozzle 5 to be fitted to the second distal end 3*a* to suppress the blur in the entire circumferential direction. It should be noted that, by applying a coating or the like to the surface of the water guide nozzle peripheral edge 5*b*, the second end 3*a* may be prevented from being damaged due to the contact with the hole 3*a*1.

As a modified example, the water guide nozzle 5 may have, for example, a structure divided into an inner member and an outer member. For example, the inner member (not shown) of the water guide nozzle 5 may be disposed inside the outer member (not shown) of the water guide nozzle 5. The inner member of the water guide nozzle 5 is made of a material having a hardness higher than that of the outer member of the water guide nozzle 5 in order to withstand the raw material treatment.

The water guide nozzle 5 has a channel 5*r* inside. The channel 5*r* communicates with the upstream nozzle water guide 6*c* (refer to FIG. 3A) of the upstream nozzle 6. The channel 5*r* may be a straight shape, a reduced diameter shape, or the like. The channel 5*r* may have any shape in accordance with the shape of the upstream nozzle water guide 6*c* and the amount of the raw material M to be passed.

As shown in FIG. 2, the upstream nozzle 6 is disposed inside the second chamber inner member 3 and downstream of the water guide nozzle 5. The upstream nozzle 6 includes a cylindrical upstream nozzle inner member 6*a* and an annular upstream nozzle outer member 6*b*. The upstream nozzle inner member 6*a* is disposed inside the upstream nozzle outer member 6*b*. The upstream nozzle inner member 6*a* is formed of a material harder than the upstream nozzle outer member 6*b* in order to withstand the raw material processing.

The upstream nozzle inner member 6*a* shown in FIGS. 3A and 4 has a plurality of the upstream nozzle water guides 6*c* (FIG. 3A) formed of through holes. The upstream nozzle water guide 6*c* supplies the raw material M in a downstream direction to the intermediate nozzle 7 (see FIG. 4). The plurality of the upstream nozzle water guides 6*c* are circumferentially spaced apart. This uniformly supplies the raw material M from multiple directions in a downstream direction to the intermediate nozzle 7 (see FIG. 4).

The upstream nozzle water guide 6*c* shown in FIG. 3A is preferably a through-hole having a circular cross-section or a through-hole having an elongated cross-section. The inner diameter dimension, the length dimension, and the number of the through-holes can be appropriately set.

As shown in FIG. 4, the intermediate nozzle 7 is disposed inside the second chamber inner member 3 and on the downstream side of the upstream nozzle 6. The intermediate nozzle 7 shown in FIG. 3B includes a cylindrical intermediate nozzle inner member 7*a* and an annular intermediate nozzle outer member 7*b*. The intermediate nozzle inner member 7*a* is disposed inside the intermediate nozzle outer member 7*b*. The raw material directly collides with the intermediate nozzle inner member 7*a*. The intermediate nozzle inner member 7*a* is thus formed of a material harder than the intermediate nozzle outer member 7*b* in order to withstand the raw material processing.

The intermediate nozzle inner member 7*a* has a plurality of intermediate nozzle water guides 7*c*. Each of the intermediate nozzle water guide 7*c* is a through-hole having a circular cross-section. The plurality of intermediate nozzle water guides 7*c* are circumferentially spaced apart. The raw material M can thus be supplied into the intermediate nozzle inner member 7*a* from multiple directions. For example, as shown in FIG. 3B, the intermediate nozzle atomizing channel 7*e* is formed radially. The raw material M can thus be uniformly supplied into the intermediate nozzle inner member 7*a* from multiple directions.

An intermediate annular groove 7*m* is formed on the outer side of the intermediate nozzle atomizing channel 7*e* and the intermediate nozzle water guide 7*c* as shown in FIGS. 2 and 4.

As shown in FIG. 4, by connecting the upstream nozzle 6 and the intermediate nozzle 7, the upstream nozzle water guide 6*c* and the intermediate nozzle water guide 7*c* are communicated to form a water guide. The raw material M is thus passed through the upstream nozzle 6 and the intermediate nozzle 7.

As shown in FIG. 3B, the intermediate nozzle water guide 7*c* is preferably a through-hole having a circular shape or an elongated hole shape in a front view. The inner diameter dimension, the length dimension, and the number of the through-holes can be appropriately set. In addition, the intermediate nozzle water guide 7*c* may be a tapered through-hole or the like other than the straight through-hole as shown in FIG. 4.

As shown in FIGS. 3B and 4, the intermediate nozzle inner member 7*a* has an intermediate nozzle atomizing channel 7*e* and an intermediate nozzle through-hole 7*f*. The intermediate nozzle through-hole 7*f* discharges the raw material M after the atomizing processing.

The intermediate nozzle atomizing channel 7*e* extends radially to atomize the raw material M. The intermediate nozzle atomizing channel 7*e* has a notch profile with a rectangular cross section. The intermediate nozzle inner member 7*a* has one or more intermediate nozzle atomizing channels 7*c*.

In the present embodiment, a plurality of the intermediate nozzle atomizing channels 7*e* are formed at intervals in the circumferential direction. The raw material M that has flowed out from the upstream nozzle water guide 6*c* flows into the intermediate nozzle atomizing channel 7*e*. The number of the intermediate nozzle atomizing channel 7*e* is larger than the number of the intermediate nozzle water guide 7*c*. The raw material M from the upstream nozzle water guide 6*c* is partially atomized by colliding with the wall surface or the like by passing through the intermediate nozzle atomizing channel 7*e* (refer to FIG. 3B). Further, the raw material M that has passed through the intermediate nozzle water guide 7*c* partially flows to the downstream nozzle 8. As shown in FIG. 4, the raw material M atomized in the intermediate nozzle atomizing channel 7*e* is supplied from the intermediate nozzle through-hole 7*f* to the downstream nozzle through-hole 8*c*, and is sent to the outlet-side merging port 9.

As shown in FIG. 4, the downstream nozzle 8 is arranged inside the second chamber inner member 3 and downstream of the intermediate nozzle 7.

As shown in FIGS. 3C and 4, the downstream nozzle 8 includes a columnar downstream nozzle inner member 8*a* and an annular downstream nozzle outer member 8*b*. The downstream nozzle inner member 8*a* is disposed inside the downstream nozzle outer member 8*b*. The raw material M directly collides with the downstream nozzle inner member 8*a*. The downstream nozzle inner member 8*a* is thus preferably formed of a material harder than the downstream nozzle outer member 8*b* in order to withstand the raw material processing.

The downstream nozzle inner member 8*a* shown in FIG. 3C has a downstream nozzle atomizing channel 8*d* extending radially and a downstream nozzle through-hole 8*c*.

The downstream nozzle atomizing channel 8*d* has a notched configuration. The raw material M is atomized in the downstream nozzle atomizing channel 8*d*.

The downstream nozzle through-hole 8*e* causes the raw material M atomized in the downstream nozzle atomizing channel 8*d* to flow toward the merging port 9.

In the present embodiment, the plurality of the downstream nozzle atomizing channels 8*d* are formed at intervals in the circumferential direction.

Further, a downstream nozzle annular groove 8*m* is formed on the outer side of the downstream nozzle through-hole 8*e*. The raw material M that has flowed out from the intermediate nozzle water guide 7*c* flows into the downstream nozzle atomizing channel 8*d*.

The materials of the water guide nozzle 5, the upstream nozzle 6, the intermediate nozzle 7, and the downstream nozzle 8 are preferably those having high hardness such as various metals, cemented carbide, sintered diamond, and single crystal diamond. Further, a member in consideration of abrasion resistance, a contaminant-less shaft sealing structure, and the like may be additionally arranged in a part of the upstream nozzle 6, the intermediate nozzle 7, and the downstream nozzle 8. Each surface of the upstream nozzle 6, the intermediate nozzle 7, and the downstream nozzle 8 may be coated. The coating may be applied only to the surface of the portion to which the raw material M is applied or the surface of the portion to which the external force is applied. This suppresses wear of the upstream nozzle 6, the intermediate nozzle 7, and the downstream nozzle 8.

Figure 5:
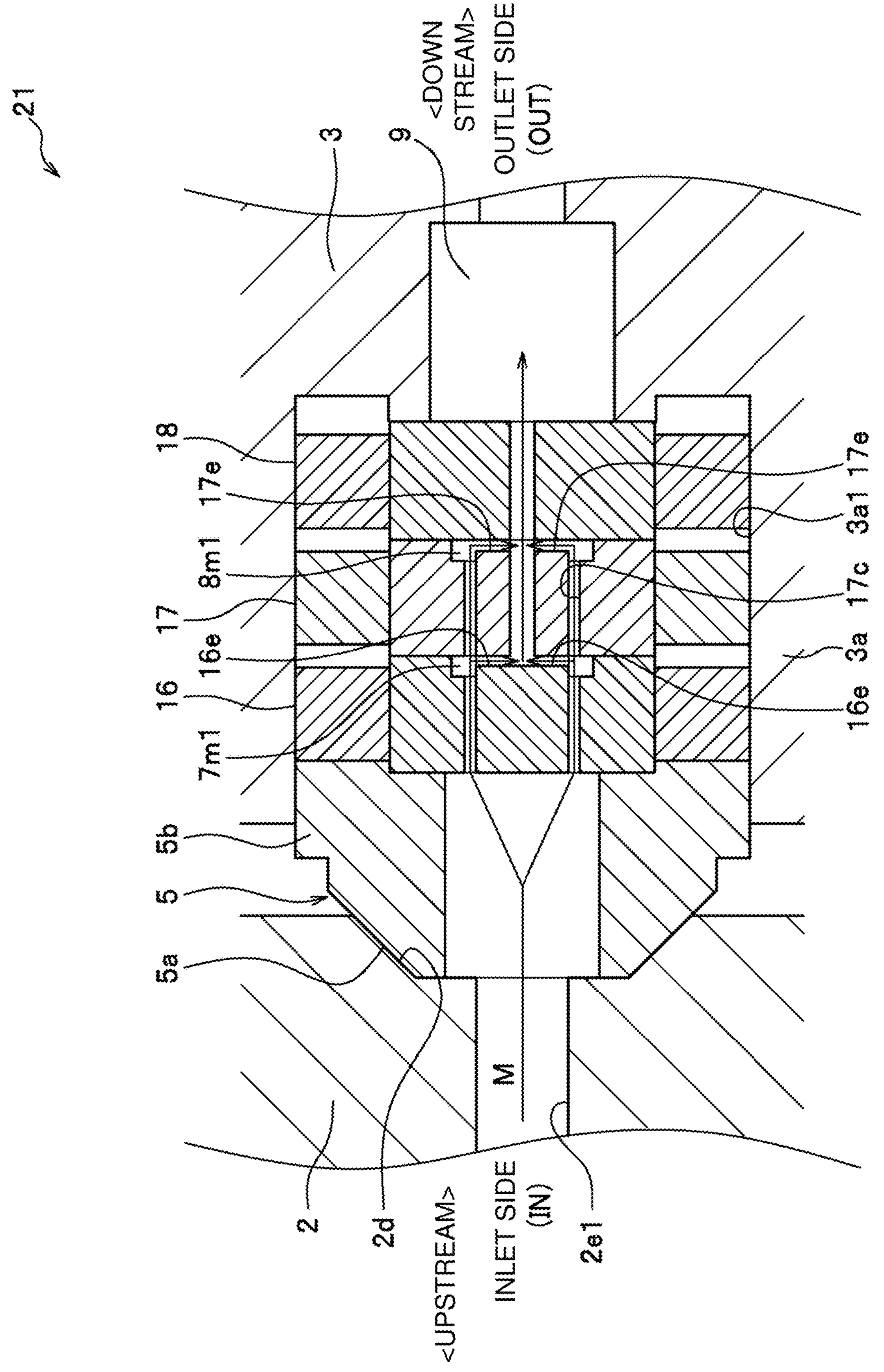
FIG. 5 is an enlarged sectional view of a main portion of a slit chamber according to another embodiment.

FIG. 5 is an enlarged sectional view of a main portion of the slit chamber 21 according to another embodiment.

In the slit chamber 21 according to another embodiment, the intermediate nozzle atomizing channel 7*e* of the embodiment shown in FIG. 4 is changed to an upstream nozzle atomizing channel 16*e*, and the downstream nozzle atomizing channel 8*d* of the embodiment is changed to an intermediate nozzle atomizing channel 17*c*.

That is, in the slit chamber 1 of the embodiment shown in FIG. 4, the intermediate nozzle atomizing channel 7*e* is arranged on the downstream side of a boundary surface between the upstream nozzle 6 and the intermediate nozzle 7. Further, the downstream nozzle atomizing channel 8*d* is arranged on the downstream side of a boundary surface between the intermediate nozzle 7 and the downstream nozzle 8.

On the other hand, in the slit chamber 21 of another embodiment shown in FIG. 5, the upstream nozzle atomizing channel 16*e* is arranged on the upstream side of a boundary surface between the upstream nozzle 16 and the intermediate nozzle 17. Further, the intermediate nozzle atomizing channel 17*e* is arranged on the upstream side of a boundary surface between the intermediate nozzle 17 and the downstream nozzle 18.

Further, in the slit chamber 21 shown in FIG. 5 of another embodiment, an upstream annular groove 7*m*1 is arranged on the upstream side of a boundary surface between the upstream nozzle 16 and the intermediate nozzle 17. Further, an intermediate annular groove 8*m*1 is arranged on the upstream side of a boundary surface between the intermediate nozzle 17 and the downstream nozzle 18.

Figure 6A:
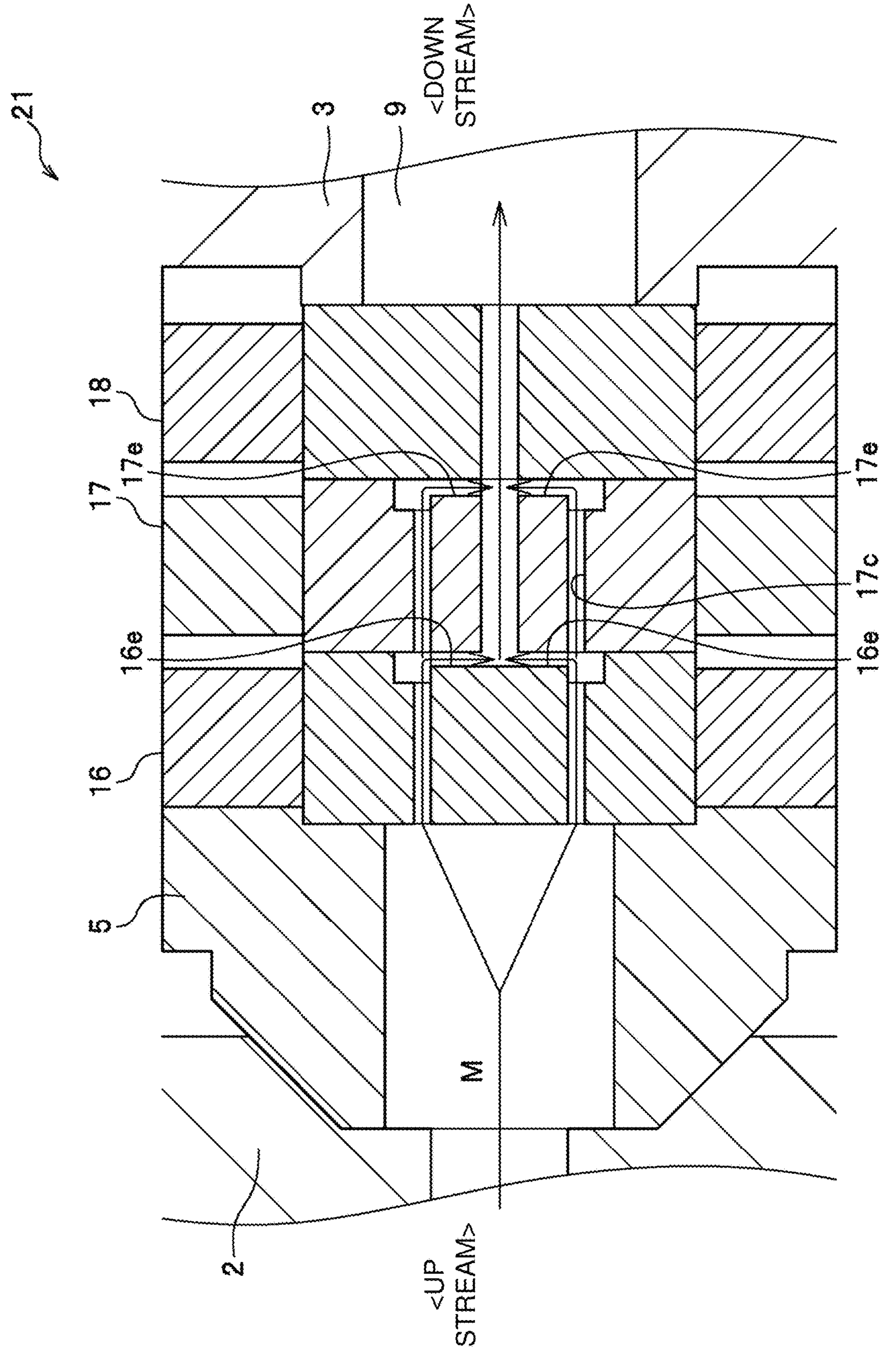
FIG. 6A is a schematic sectional view of the slit chamber of another embodiment showing a flow of a raw material.

Also in the slit chamber 21 of another example shown in FIG. 5, the raw material M can be atomized. FIG. 6A schematically shows the flow of the raw material M in the slit chamber 21 of another embodiment shown in FIG. 5.

In the slit chamber 21 of another embodiment, the raw material M once entering the intermediate nozzle water guide 17*c* does not flow into the upstream nozzle atomizing channel 16*e* from the downstream side. The raw material M smoothly flows to the upstream nozzle atomizing channel 16*e* and the intermediate nozzle atomizing channel 17*e*.

Figure 6B:
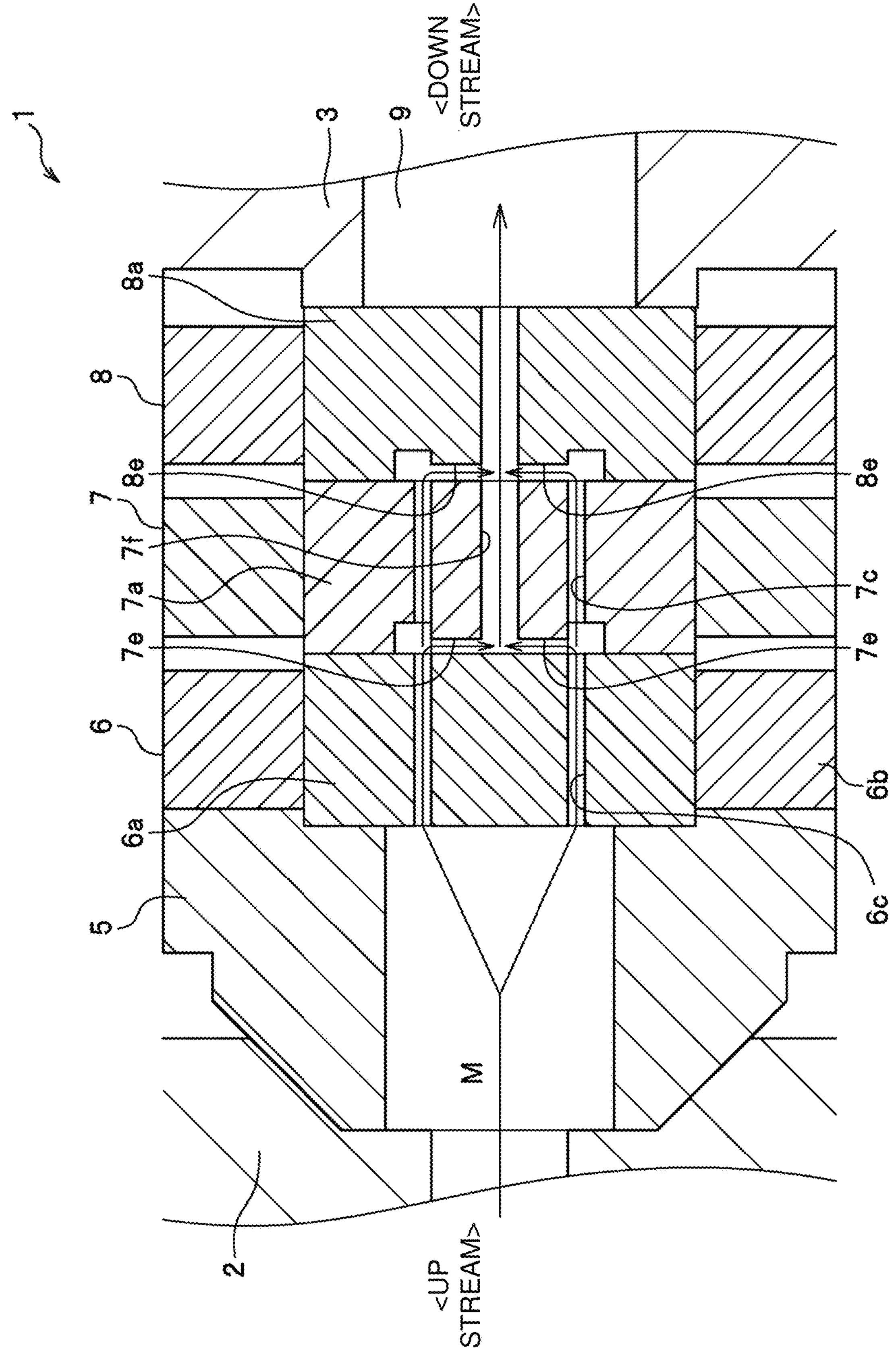
FIG. 6B is a schematic sectional view of the slit chamber according to the embodiment showing a flow of a raw material.

FIG. 6B schematically shows a flow of the raw material M in the slit chamber 1 according to the embodiment.

In the slit chamber 1 of the embodiment shown in FIG. 4, the raw material M once entering the intermediate nozzle water guide 7*c* does not flow into the intermediate nozzle atomizing channel 7*e* from the downstream side.

In the flow of the raw material M, the slit chamber 1 of the embodiment has an advantage over the slit chamber 21 of another embodiment, and the raw material M is less likely to be clogged in the intermediate nozzle atomizing channel 7*e* or the downstream nozzle atomizing channel 8*d*.

Figure 7:
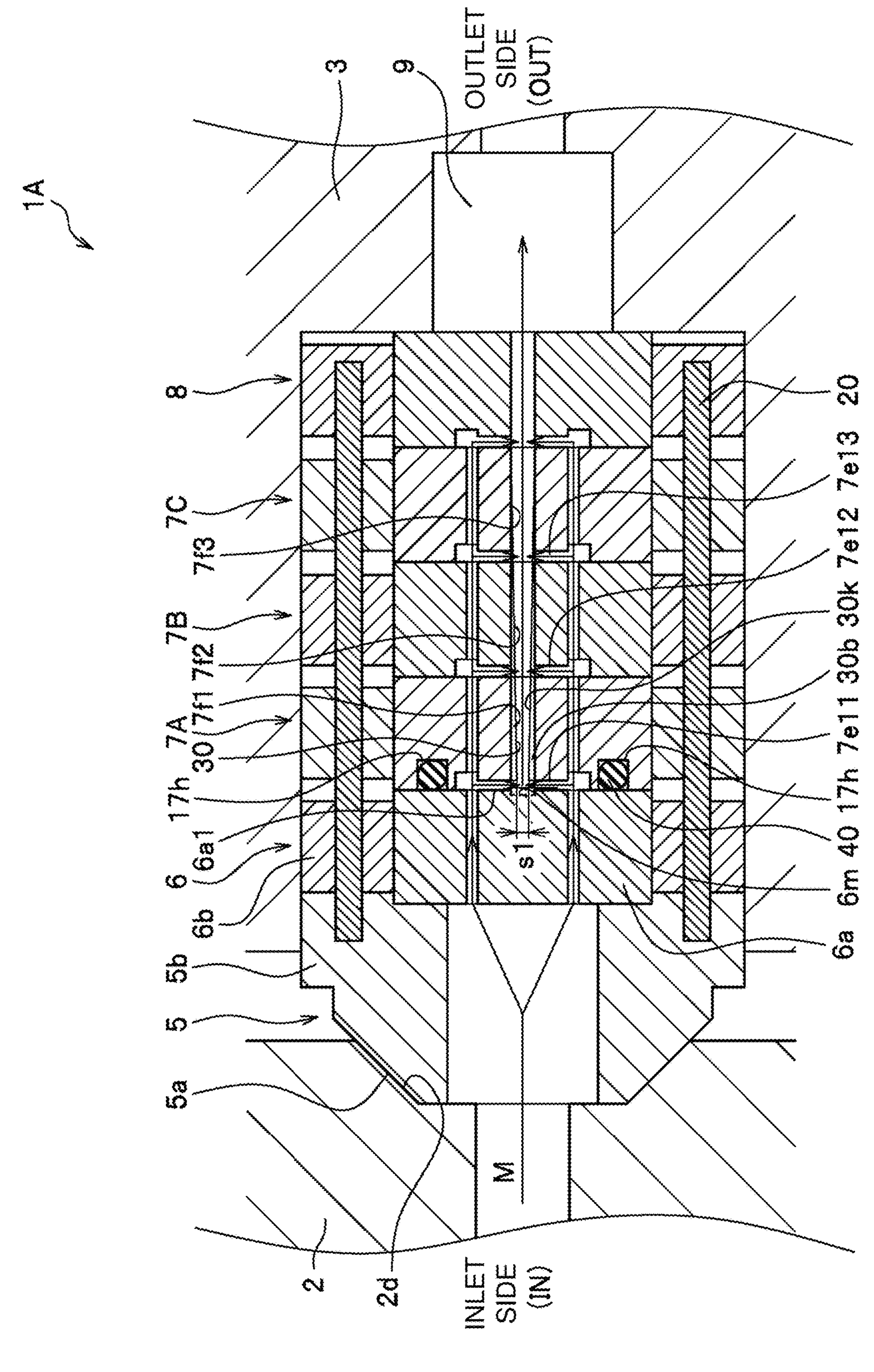
FIG. 7 is an enlarged sectional view of a main portion of a slit chamber according to a modified example.

FIG. 7 shows an enlarged sectional view of a main part of a slit chamber 1A according to a modified example. The slit chamber 1A includes a plurality of intermediate nozzles between the upstream nozzle 6 and the downstream nozzle 8. (In the example shown in FIG. 7, the slit chamber 1A includes a first intermediate nozzle 7A, a second intermediate nozzle 7B, and a third intermediate nozzle 7C.

The upstream nozzle 6 of the modified example includes a columnar upstream nozzle inner member 6*a* and an annular upstream nozzle outer member 6*b*.

A recess 6*m* is formed in the center of the downstream side edge 6*a*1 of the upstream nozzle inner member 6*a*. The recess 6*m*, which is a columnar space, faces the intermediate nozzle through-hole 7*f*1 in the intermediate nozzle 7A. The recess 6*m* alleviates the collision of the raw material M with the downstream side edge 6*a*1, and suppresses the wear of the downstream side edge 6*al*.

A recess similar to the recess 6*m* may be formed in the center of the downstream side edge 6*a*1 of the upstream nozzle inner member 6*a* shown in FIG. 4. The recess faces the intermediate nozzle through-hole 7*f*1 of the first intermediate nozzle 7A. This suppresses wear of the downstream side edge 6*a*1 (see FIG. 4) by the raw material M.

In addition, the through-hole taper portion 30 having a progressively larger diameter s1 may be disposed or formed with respect to the intermediate nozzle through-holes 7*f*1, 7*f*2, 7*f*3 shown in FIG. 7.

As shown in FIG. 7, when the plurality of first intermediate nozzle 7A, the second intermediate nozzle 7B, and the third intermediate nozzle 7C are arranged, the processed raw material M passes through the intermediate nozzle through-holes 7*f*1, 7*f*2, 7*f*3.

When the distance between the inlet side of the intermediate nozzle through-hole 7*f*1 and the outlet side of the intermediate nozzle through-hole 7*f*3 increases, the total volume of the intermediate nozzle through-holes 7*f*1, 7*f*2, 7*f*3 increases. Considering the energy flow associated with the discharge from the merging port 9, it is preferable that the processed raw material M is not left as far as possible at the inlet side of the intermediate nozzle through-hole 7*f*1.

The diameter s1 may thus be gradually or stepwise reduced or increased from the inlet side of the intermediate nozzle through-hole 7*f*1 toward the outlet side of the intermediate nozzle through-hole 7*f*3.

The through-hole taper portion 30 may be formed in the first intermediate nozzle 7A, the second intermediate nozzle 7B, and the third intermediate nozzle 7C. Alternatively, in order to easily connect the plurality of the first intermediate nozzle 7A, the second intermediate nozzle 7B and the third intermediate nozzle 7C, the through-hole taper member 30*b* may be independently fitted into the intermediate nozzle through-hole 30*k* formed in the first intermediate nozzle 7A, the second intermediate nozzle 7B, and the third intermediate nozzle 7C, and the through-hole taper member 30*b* may be fixed on at least one position in the front and rear.

The intermediate nozzle inner member 7*a* shown in FIG. 3B may have an annular intermediate nozzle groove 7*g* and a discharge hole 7*h* that is a through-hole.

Even when the upstream nozzle 6 and the intermediate nozzle 7 are connected to each other, the raw material M is pressurized from the inside of each of the upstream nozzle 6 and the intermediate nozzle 7. This could cause the raw material M to leak from the gap between the upstream nozzle 6 and the intermediate nozzle 7. An extra amount of raw material M in the intermediate nozzle 7 can be accommodated in the intermediate nozzle groove 7*g*. This reduces leakage of the raw material M from between the upstream nozzle 6 and the intermediate nozzle 7.

Further, the intermediate nozzle inner member 7*a* has a discharge hole 7*h* that is a through-hole. Thus, when the raw material M is likely to leak into the gap between the upstream nozzle 6 and the intermediate nozzle 7, the raw material M is discharged from the discharge hole 7*h*. This suppresses or prevents leakage of the raw material M outside the slit chamber 1. The discharge hole 7*h* is connected to the intermediate nozzle water guide 7*c* (see FIG. 4).

As in the modified example shown in FIG. 7, leakage of the raw material M can be prevented by arranging the annular first seal member 40 between the upstream nozzle 6 and the intermediate nozzle 7. Specifically, a pocket 17*h*, which is an annular hole, is formed inside the connection surface of the upstream nozzle 6 or the intermediate nozzle 7. Leakage of the raw material M can be prevented by arranging the annular first seal member 40 in the pocket 17*h*. The first seal member 40 is, for example, a butadiene rubber, a silicone rubber, or the like.

An annular second seal member similar to the first seal member 40 may be disposed between the intermediate nozzle 7 and the downstream nozzle 8 shown in FIG. 4. This prevents leakage of the raw material M from between the intermediate flow nozzle 7 and the downstream nozzle 8. For example, a pocket (not shown), which is an annular hole, may be formed inside the connection surface between the intermediate nozzle 7 and the downstream nozzle 8. Leakage of the raw material M from the gap between the intermediate nozzle 7 and the downstream nozzle 8 is prevented by disposing the second seal member in the pocket of the annular hole.

As shown in FIG. 4, the downstream nozzle 8 is arranged on the downstream side of the intermediate nozzle 7. As shown in FIG. 3C, the downstream nozzle 8 includes a downstream nozzle inner member 8*a* and a downstream nozzle outer member 8*b*. The downstream nozzle inner member 8_a_ is disposed inside the downstream nozzle outer member 8_b_. The downstream nozzle inner member 8_a_ is formed of a material harder than the downstream nozzle outer member 8_b_ in order to withstand the atomizing processing of the raw material M.

The downstream nozzle 8 includes a downstream nozzle atomizing channel 8_d_ extending radially and a downstream nozzle through-hole 8_c_.

The raw material M is atomized in the downstream nozzle atomizing channel 8_d_. The downstream nozzle atomizing channel 8_d_ has a cutout having a substantially rectangular cross-section. The downstream nozzle 8 includes one or more downstream nozzle atomizing channels 8_d_. The downstream nozzle atomizing channel 8_d_ may have any cross-sectional shape.

A downstream nozzle annular groove 8_m_ is formed on the outer side of the downstream nozzle atomizing channel 8_d_.

The raw material M supplied from the intermediate nozzle water guide 7_c_ passes through the downstream nozzle atomizing channel 8_d_. This can process the raw material M that has not been subjected to the atomizing processing in the intermediate nozzle 7.

The downstream nozzle through-hole 8_e_ discharges the raw material M after the atomizing processing in the downstream nozzle atomizing channel 8_d_ or the like.

The raw material M passes through the upstream nozzle water guide 6_c_ to be processed in the intermediate nozzle atomizing channel 7_e_. The raw material M that has not been processed by the intermediate nozzle atomizing channel 7_e_ passes through the intermediate nozzle water guide 7_c_ to be processed by the downstream nozzle atomizing channel 8_d_. This increases the processing amount of atomizing of the raw material M. The raw material M after the atomizing processing is discharged from the merging port 9 through the intermediate nozzle through-hole 7_f_ and the downstream nozzle through-hole 8_c_.

Conventionally, a plurality of the slit chambers are used in order to increase the processing amount of the raw material M. On the other hand, as in the modified example shown in FIG. 7, a plurality of the intermediate nozzles 7 may be arranged. For example, as shown in FIG. 7, it is preferable to arrange the first intermediate nozzle 7A, the second intermediate nozzle 7B, and the third intermediate nozzle 7C. The number of the intermediate nozzles 7 is not limited. This can increase the processing amount of the atomizing of the raw material M.

The first intermediate nozzle 7A includes a first intermediate nozzle atomizing channel 7_e_11. The second intermediate nozzle 7B includes a second intermediate nozzle atomizing channel 7_e_12. The third intermediate nozzle 7C includes a third intermediate nozzle atomizing channel 7_e_13. The first intermediate nozzle atomizing channel 7_e_11, the second intermediate nozzle atomizing channel 7_e_12, and the third intermediate nozzle atomizing channel 7_e_13 have the same configuration as the intermediate nozzle atomizing channel 7_e_. The atomizing processing can be performed in the first intermediate nozzle atomizing channel 7_e_11, the second intermediate nozzle atomizing channel 7_e_12, and the third intermediate nozzle atomizing channel 7_e_13. This prevents the size of the atomizing apparatus 100 including the slit chamber 1 from increasing.

The pocket 17_h_ and the seal member 40 may be disposed on the inner wall surfaces of the first to third intermediate nozzle 7A to 7C. This prevents leakage of the raw material M.

According to the above configuration, even when the input amount of the raw material M into the slit chamber 1 is increased, shear stress and collision force are continuously applied to the raw material M to atomize the raw material M at a large flow rate. Further, the slit chamber 1 and the atomizing apparatus 100 capable of suppressing leakage of the raw material M are provided.

First Modification

Figure 8:
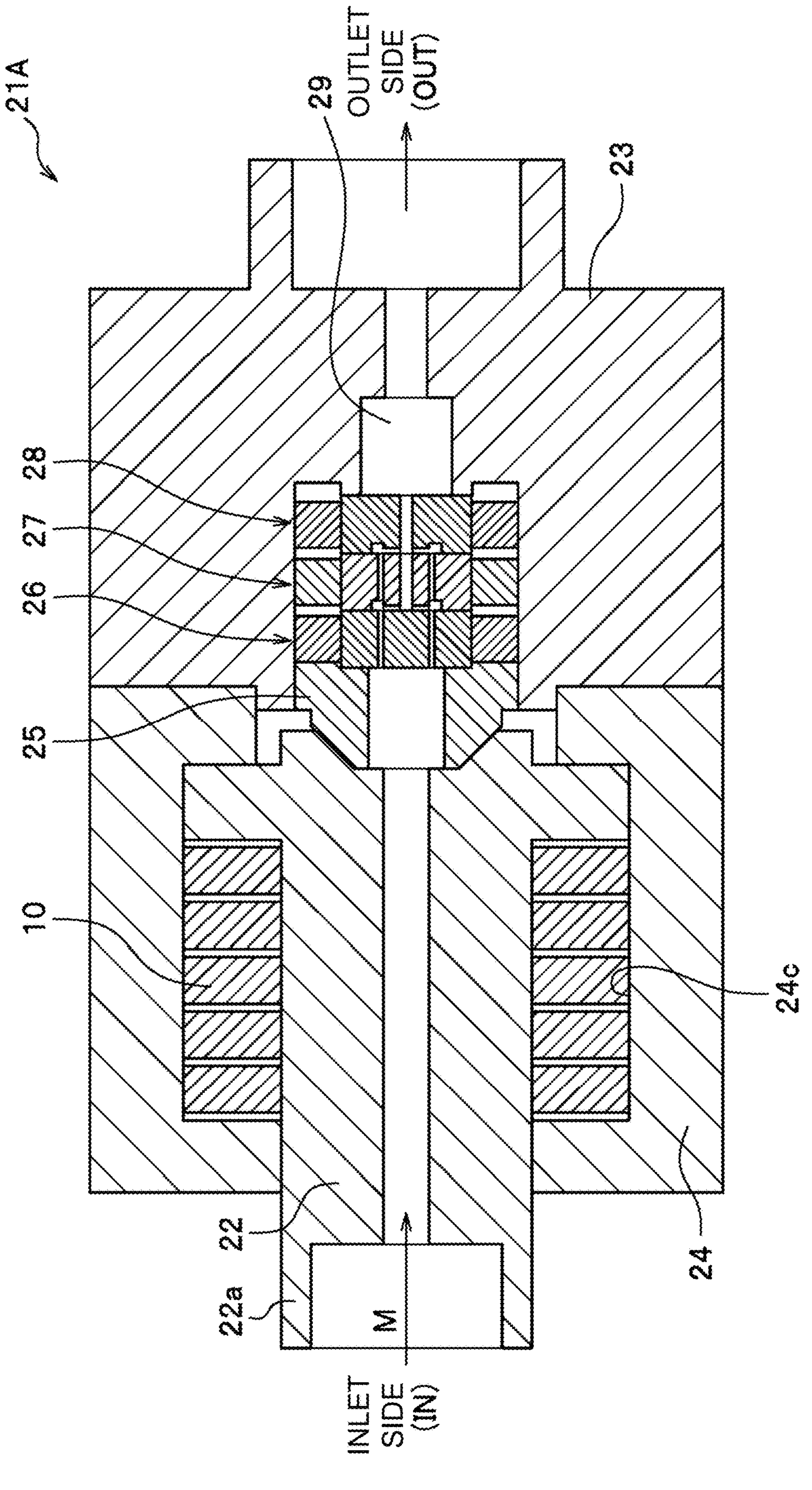
FIG. 8 is a sectional view of a slit chamber according to a first modification.

FIG. 8 shows a sectional view of a slit chamber 21A according to a first modification.

The slit chamber 21A according to the modification atomizes the pressurized slurry raw material M. The slit chamber 21A has a substantially columnar shape.

In the slit chamber 21A, the slurry raw material M is supplied from a first end 22_a_ on the inlet side (IN) toward the outlet side (OUT).

The slit chamber 21A includes a first chamber inner member 22, a second chamber inner member 23, and a chamber outer member 24.

The first chamber inner member 22 includes an annular first end 22_a_.

The second chamber inner member 23 is coupled to the first chamber inner member 22. The chamber outer member 24 is disposed outside the first chamber inner member 22 and a portion of the second chamber inner member 23.

A water guide nozzle 25, an upstream nozzle 26, a downstream nozzle 27, a load receiving nozzle 28, and a merging port 29 are disposed inside the second chamber inner member 23. The water guide nozzle 25 is joined to the first chamber inner member 22. The upstream nozzle 26 is disposed on the downstream side of the water guide nozzle 25. The downstream nozzle 27 is disposed on the downstream side of the upstream nozzle 26. The load receiving nozzle 28 is disposed on the downstream side of the downstream nozzle 27.

The chamber outer member 24 has a recess 24_c_ inside. The recess 24_c_ is a cylindrical space. A tightening adjuster 10 is disposed in a space defined by the recess 24_c_ and the exterior of the first chamber inner member 22.

The tightening adjuster 10 includes an elastic member such as one or a plurality of compression springs. This applies an elastic force for avoiding excessive tightening of the first chamber inner member 22, the water guide nozzle 25, the upstream nozzle 26, the downstream nozzle 27, the load receiving nozzle 28, and the like.

As shown in FIG. 7, a fastener 20 for fastening the upstream nozzle 6, the intermediate nozzles (7A, 7B, 7C), and the downstream nozzle 8 may be arranged. In particular, when a plurality of the intermediate nozzles 7 such as a first intermediate nozzle 7A, a second intermediate nozzle 7B, a third intermediate nozzle 7C, and the like are arranged, leakage of the raw material M may occur from the contact surfaces of the respective intermediate nozzles (7A, 7B, 7C). The fastener 20 can thus be disposed to tighten between the intermediate nozzles (7A, 7B, 7C) to suppress leakage of the raw material M. The fastener 20 is, for example, a fastening pin or a screw.

The fastener 20 may be arranged by dividing it into the upstream nozzle 6 and the intermediate nozzle 7, the intermediate nozzles (7A, 7B, 7C) to each other, the intermediate nozzle 7 and the downstream nozzle 8, the upstream nozzle 6 and the downstream nozzle 8, and the like. An optimum combination can be set in accordance with an external force or the like applied in the channel. Note that the fastener 20 may be disposed not only in one direction but also in a plurality of different directions.

Second Modification

Figure 9A:
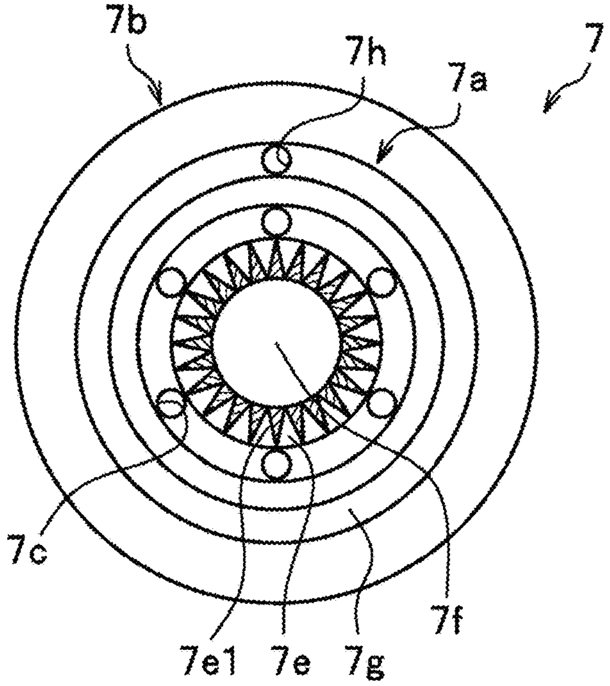
FIG. 9A is a diagram showing an atomizing channel tapered portion for an intermediate nozzle according to a second modification.

FIG. 9A shows an intermediate nozzle atomizing channel tapered portion 7_e_1 according to a second modification. FIG.

9B shows a downstream nozzle atomizing channel tapered portion 8*d*1 according to the second modification.

In the second modification, the intermediate nozzle atomizing channel 7*e* shown in FIG. 3B of the embodiment is modified to the intermediate nozzle atomizing channel tapered portion 7*e*1 shown in FIG. 9A. In addition, the downstream nozzle atomizing channel 8*d* shown in FIG. 3C is changed to the downstream nozzle atomizing channel tapered portion 8*d*1 shown in FIG. 9B.

That is, instead of the intermediate nozzle atomizing channel 7*e* shown in FIG. 3B, the intermediate nozzle atomizing channel tapered portion 7*e*1 of the second modification may be formed. In addition, instead of the downstream nozzle atomizing channel 8*d* shown in FIG. 3C, the downstream nozzle atomizing channel tapered portion 8*d*1 the second modification may be formed.

This strengthens the shearing force applied to the raw material M.

As shown in FIG. 9A, the taper of the intermediate nozzle atomizing channel tapered portion 7*e*1 preferably has a shape of wider outer side and a narrower inner side such that the raw material M is smoothly supplied from the intermediate nozzle atomizing channel tapered portion 7*e*1 to the intermediate nozzle through-hole 7*f*.

Figure 9B:
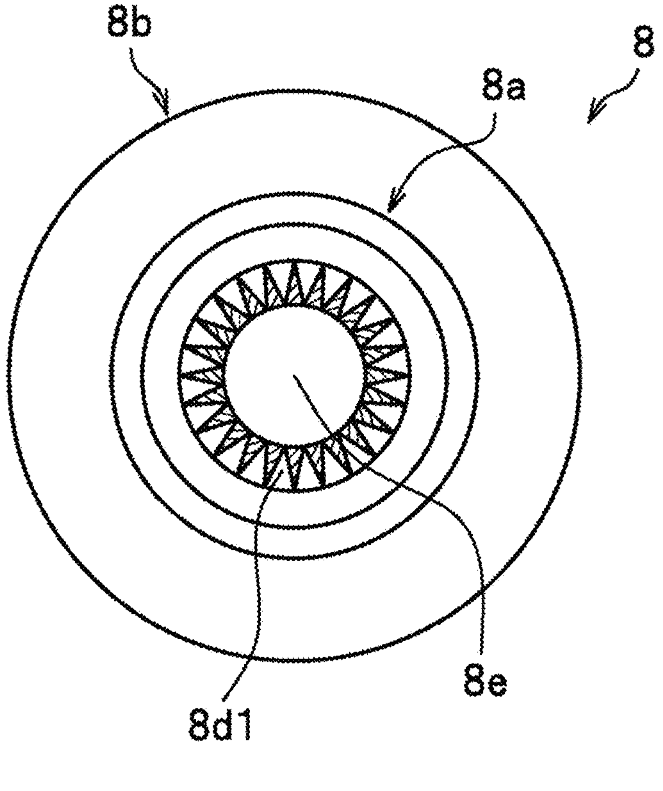
FIG. 9B is a diagram showing an atomizing channel tapered portion for a downstream nozzle according to the second modification.

Similarly, as shown in FIG. 9B, the taper of the downstream nozzle atomizing channel tapered portion 8*d*1 preferably has a shape of wider outer side and a narrower inner side such that the raw material M is smoothly supplied from the downstream nozzle atomizing channel tapered portion 8*d*1 to the downstream nozzle through-hole 8*e*.

Note that the intermediate nozzle atomizing channel tapered portion 7*e*1 and the downstream nozzle atomizing channel tapered portion 8*d*1 may not be tapered, but may be a channel such as a step shape.

Third Modification

Figure 10A:
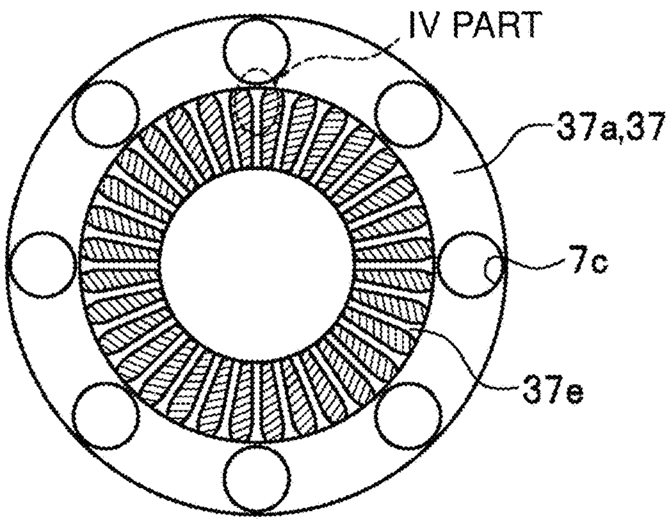
FIG. 10A is an enlarged front view of the intermediate nozzle, which is a II-II cross-section of FIG. 2 according to the third modification.

FIG. 10A is an enlarged front view of an intermediate nozzle 37 according to a third modification, which is II-II cross-section of FIG. 2. An intermediate nozzle inner member 37*a* of the intermediate nozzle 37 in the third modification has a plurality of intermediate nozzle water guides 7*c*. The intermediate nozzle water guide 7*c* is a through-hole. The plurality of the intermediate nozzle water guides 7*c* are circumferentially spaced apart.

In addition, a plurality of intermediate nozzle atomizing channels 37*e* are formed in the intermediate nozzle inner member 37*a*. The intermediate nozzle atomizing channel 37*e*, which extends radially, has a cutout having a substantially rectangular cross section.

Figure 10B:
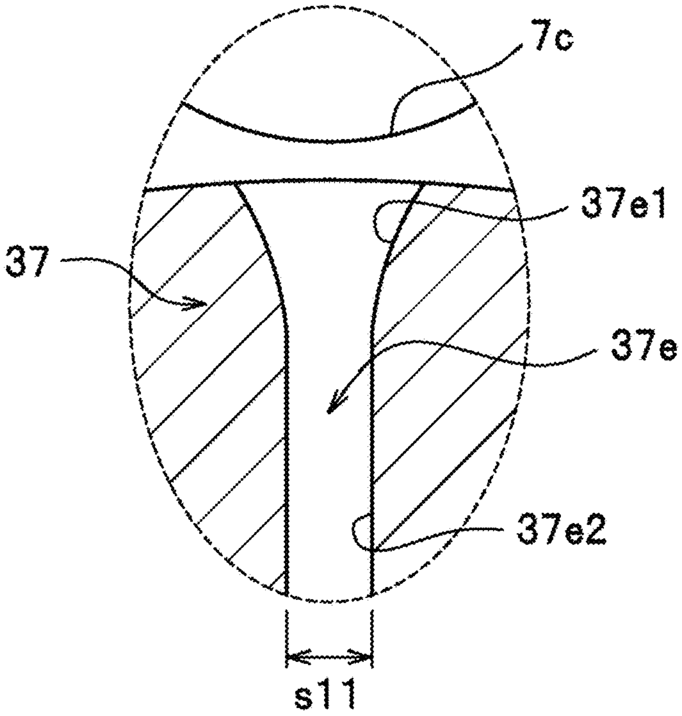
FIG. 10B is an enlarged view of IV part in FIG. 10A.

FIG. 10B shows an enlarged view of IV part of FIG. 10A. An inlet 37*e*1 of the intermediate nozzle atomizing channel 37*e* is shaped to have a convex curvature. This suppresses clogging of the raw material M in the inlet portion 37*e*1. A downstream channel 37*e*2 that is located downstream from the inlet 37*e*1 is linear having a constant channel width s11.

The inlet 8*d*0 of the downstream nozzle atomizing channel 8*d* shown in FIG. 3C preferably has a convex curvature similar to FIG. 10B. This suppresses clogging of the raw material M in the inlet 8*d*0.

Figure 11A:
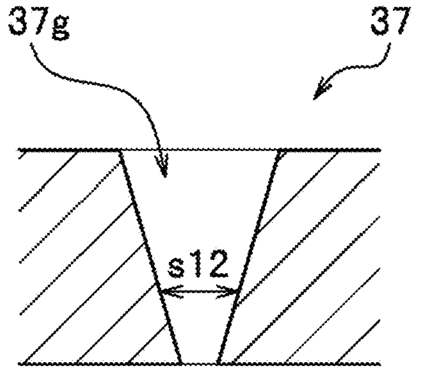
FIG. 11A is an enlarged front view of the intermediate nozzle, which is a II-II cross-section of FIG. 2 according to a first modified example of the third modification.

FIG. 11A shows an enlarged front view of the intermediate nozzle 37 of a first variation of the third modification, which is II-II cross-section of FIG. 2. The intermediate nozzle atomizing channel 37*g* of the first variation has a linear shape in which a channel width s12 is narrowed toward the downstream side. The rate at which the channel width s12 is narrowed, that is, an inclination angle of the side wall of the intermediate nozzle atomizing channel 37*g* may be determined arbitrarily as appropriate. When the channel width s12 is increased at the upstream side and gradually decreased toward the downstream side, clogging of the raw material M is suppressed as compared with a case where the channel width s12 is constant.

This suppresses clogging of the raw material M in the intermediate nozzle atomizing channel 37*g*.

Figure 11B:
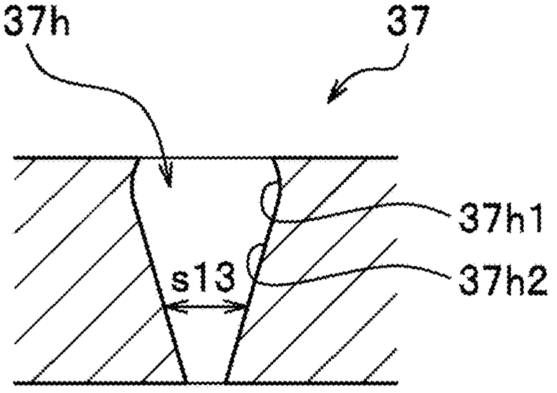
FIG. 11B is an enlarged front view of the intermediate nozzle, which is a II-II cross-section of FIG. 2 according to a second modified example of the third modification.

FIG. 11B shows an enlarged front view of the intermediate nozzle 37 of a second variation of the third modification, which is II-II cross-section of FIG. 2. An inlet 37*h*1 of the intermediate nozzle atomizing channel 37*h* of the second variation has a concave curvature. A downstream portion 37*h*2 that is located downstream from the inlet 37*h*1 is shaped such that the channel width s13 is narrowed toward the downstream side.

This suppresses clogging of the raw material M in the intermediate nozzle atomizing channel 37*h* including the inlet 37*h*1.

Figure 11C:
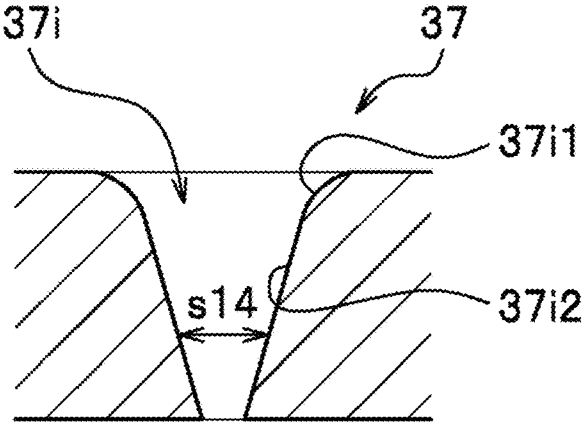
FIG. 11C is an enlarged front view of the intermediate nozzle, which is a II-II cross-section of FIG. 2 according to a third modified example of the third modification.

FIG. 11C shows an enlarged front view of the intermediate nozzle 37 of a third variation of the third modification, which is II-II cross-section of FIG. 2. An inlet 37*i*1 of the intermediate nozzle atomizing channel 37*i* of the third variation has a convex curvature. A downstream portion 37*i*2 that is located downstream from the inlet 37*i*1 is shaped such that the channel width s4 is narrowed toward the downstream side.

This suppresses clogging of the raw material M in the intermediate nozzle atomizing channel 37*i* including the inlet 37*i*1.

Note that the examples shown in FIGS. 11A to 11C may be applied to the downstream nozzle through-hole 8*e* shown in FIG. 3C.

According to the above-described embodiment, modification, and the like, even when the input amount of the raw material M increases, the material M can be processed by continuously applying the shear stress and the collision force to the raw material M with large flow rate. Further, the atomizing apparatus 100 capable of preventing or suppressing leakage of the raw material M is provided.

The present invention is not limited to the above-described embodiments, and it is needless to say that the present invention can be appropriately modified without departing from the spirit thereof.

The present invention is not limited to the configurations of the above-described embodiments and modifications, and various modifications and specific forms can be made within the scope of the appended claims.

REFERENCE SIGNS LIST

1 Slit chamber
2 First chamber inner member
3 Second chamber inner member
4 Chamber outer member
5 Water guide nozzle
6 Upstream nozzle
6*c* Upstream nozzle water guide
7 Intermediate nozzle
7A First intermediate nozzle
7B Second intermediate nozzle
7C Third intermediate nozzle
7*e* Intermediate nozzle atomizing channel
7*e*1 Intermediate nozzle atomizing channel tapered portion (tapered portion)
7*e*11 First intermediate nozzle atomizing channel (Intermediate nozzle atomizing channel)
7*e*12 Second intermediate nozzle atomizing channel (Intermediate nozzle atomizing channel)

**7*e*13** Third intermediate nozzle atomizing channel (Intermediate nozzle atomizing channel)
**7*f*** Intermediate nozzle through-hole
**7*g*** Intermediate nozzle groove
**7*h*** Discharge hole
8 Downstream nozzle
**8*d*** Downstream nozzle atomizing channel
**8*d*0** Inlet
**8*d*1** Downstream nozzle atomizing channel tapered portion (tapered portion)
**8*e*** Downstream nozzle through-hole
9 Merging port
20 Fastener
30 Through-hole taper portion
**37*h*1** Inlet (Inlet with concave curvature)
**37*i*1** Inlet (Inlet with convex curvature)
40 Seal member
100 Atomizing apparatus
101 Raw material tank
102 Liquid supply pump
103 Pressure intensifier
M Raw material

What is claimed is:

1. A slit chamber, comprising:
a slurry guide nozzle to which a raw material is introduced;
an upstream nozzle disposed downstream of the slurry guide nozzle, the upstream nozzle including an upstream nozzle slurry guide for the raw material to pass through;
an intermediate nozzle disposed downstream of the upstream nozzle, the intermediate nozzle including
an intermediate nozzle slurry guide communicated to the upstream nozzle slurry guide, and
an intermediate nozzle atomizing channel to atomize the raw material, the intermediate nozzle atomizing channel directly communicates with the intermediate nozzle slurry guide; and
a downstream nozzle disposed downstream of the intermediate nozzle, the downstream nozzle including a downstream nozzle atomizing channel to atomize the raw material that has flown from the intermediate nozzle.

2. The slit chamber according to claim 1, wherein
at least one of the intermediate nozzle atomizing channel and the downstream nozzle atomizing channel includes a tapered portion.

3. The slit chamber according to claim 1, wherein
the intermediate nozzle includes an intermediate nozzle through-hole for flowing the raw material atomized in the intermediate nozzle atomizing channel toward downstream, and
the downstream nozzle includes a downstream nozzle through-hole for flowing the raw material atomized in the downstream nozzle atomizing channel toward downstream.

4. The slit chamber according to claim 3, wherein
the intermediate nozzle includes a through-hole taper portion on an inner surface of the intermediate nozzle through-hole.

5. The slit chamber according to claim 1, wherein
a plurality of the intermediate nozzles are arranged in series.

6. The slit chamber according to claim 1, wherein
a plurality of the intermediate nozzle atomizing channels and/or a plurality of the downstream nozzle atomizing channels are arranged radially.

7. The slit chamber according to claim 1, wherein
at least one of the intermediate nozzle atomizing channel and the downstream nozzle atomizing channel has a shape having a smaller cross-sectional area toward downstream.

8. The slit chamber according to claim 1, wherein
at least one of the intermediate nozzle atomizing channel and the downstream nozzle atomizing channel has an inlet having a convex curvature or a concave curvature at an end.

9. The slit chamber according to claim 1, wherein
the intermediate nozzle has
an intermediate nozzle groove to which the raw material enters, and
a discharge hole to which leaked raw material enters.

10. The slit chamber according to claim 1, further comprising:
a fastener configured to tighten the upstream nozzle, the intermediate nozzle, and the downstream nozzle.

11. The slit chamber according to claim 1, further comprising:
a seal member disposed between the upstream nozzle and the intermediate nozzle or between the intermediate nozzle and the downstream nozzle.

12. The slit chamber according to claim 1, further comprising:
a plurality of the intermediate nozzles, and
a seal member disposed between the plurality of the intermediate nozzles.

13. The slit chamber according to claim 2, wherein
the intermediate nozzle includes an intermediate nozzle through-hole for flowing the raw material atomized in the intermediate nozzle atomizing channel toward downstream, and
the downstream nozzle includes a downstream nozzle through-hole for flowing the raw material atomized in the downstream nozzle atomizing channel toward downstream.

14. The slit chamber according to claim 2, wherein
a plurality of the intermediate nozzle atomizing channels and/or a plurality of the downstream nozzle atomizing channels are arranged radially.

15. The slit chamber according to claim 3, wherein
a plurality of the intermediate nozzle atomizing channels and/or a plurality of the downstream nozzle atomizing channels are arranged radially.

16. The slit chamber according to claim 4, wherein
a plurality of the intermediate nozzle atomizing channels and/or a plurality of the downstream nozzle atomizing channels are arranged radially.

17. The slit chamber according to claim 5, wherein
a plurality of the intermediate nozzle atomizing channels and/or a plurality of the downstream nozzle atomizing channels are arranged radially.

18. The slit chamber according to claim 2, wherein
at least one of the intermediate nozzle atomizing channel and the downstream nozzle atomizing channel has a shape having a smaller cross-sectional area toward downstream.

19. The slit chamber according to claim 3, wherein
at least one of the intermediate nozzle atomizing channel and the downstream nozzle atomizing channel has a shape having a smaller cross-sectional area toward downstream.

20. An atomizing apparatus, comprising:
a raw material tank configured to store a raw material;

a liquid supply pump configured to pressurize and supply the raw material in the raw material tank;

a pressure intensifier configured to pressurize the raw material supplied from the liquid supply pump; and the slit chamber according to claim 1.

* * * * *